United States Patent [19]

Cooke et al.

[11] Patent Number: 6,110,994

[45] Date of Patent: Aug. 29, 2000

[54] POLYMERIC PRODUCTS CONTAINING MODIFIED CARBON PRODUCTS AND METHODS OF MAKING AND USING THE SAME

[75] Inventors: Joel M. Cooke; Collin P. Galloway, both of Nashua, N.H.; Mark A. Bissell, Pepperell, Mass.; Curtis E. Adams, Watertown, Mass.; Michael C. Yu, Chelmsford, Mass.; James A. Belmont, Acton, Mass.; Robert M. Amici, Berlin, Mass.

[73] Assignee: Cabot Corporation, Boston, Mass.

[21] Appl. No.: 08/990,715

[22] Filed: Dec. 15, 1997

Related U.S. Application Data

[63] Continuation-in-part of application No. 08/663,694, Jun. 14, 1996, Pat. No. 5,698,016.

[51] Int. Cl.⁷ .................................................... C08K 9/00
[52] U.S. Cl. .......................................... 523/215; 524/495
[58] Field of Search ........................... 523/215; 524/495, 524/496

[56] References Cited

U.S. PATENT DOCUMENTS

| | | | |
|---|---|---|---|
| T060,001 | 3/1969 | Gessler | 260/41.5 |
| 2,121,535 | 6/1938 | Amon | 106/473 |
| 2,439,442 | 4/1948 | Amon et al. | 23/209.1 |
| 2,793,100 | 5/1957 | Weihe | 423/460 |
| 2,867,540 | 1/1959 | Harris | 106/476 |
| 3,011,902 | 12/1961 | Jordon | 106/30 R |
| 3,025,259 | 3/1962 | Watson et al. | 106/476 |
| 3,317,458 | 5/1967 | Clas et al. | 260/41.5 |
| 3,335,020 | 8/1967 | Aboytes et al. | 106/476 |
| 3,423,391 | 1/1969 | Kindler et al. | 260/141 |
| 3,528,840 | 9/1970 | Aboytes | 106/473 |
| 3,671,476 | 6/1972 | Terai et al. | 260/23 |
| 3,686,111 | 8/1972 | Makhlouf et al. | 524/530 |
| 4,006,031 | 2/1977 | Ferch et al. | 106/473 |
| 4,014,844 | 3/1977 | Vidal et al. | 106/472 |
| 4,265,768 | 5/1981 | Beasley et al. | 210/682 |
| 4,299,736 | 11/1981 | Datta | 252/506 |
| 4,320,011 | 3/1982 | Sato et al. | 210/694 |
| 4,366,139 | 12/1982 | Kühner et al. | 423/449 |
| 4,452,638 | 6/1984 | Gallus | 106/97 |
| 4,530,961 | 7/1985 | Nguyen et al. | 106/20 R |
| 4,537,633 | 8/1985 | Hong | 106/96 |
| 4,597,794 | 7/1986 | Ohta et al. | 106/20 C |
| 4,608,402 | 8/1986 | Redick | 523/215 |
| 4,631,304 | 12/1986 | Wilder | 523/215 |
| 4,764,547 | 8/1988 | Hatanaka | 523/215 |
| 4,820,751 | 4/1989 | Takeshita et al. | 523/215 |
| 4,831,011 | 5/1989 | Oikawa et al. | 502/406 |
| 5,130,363 | 7/1992 | Scholl et al. | 524/392 |
| 5,159,009 | 10/1992 | Wolff et al. | 106/475 |
| 5,184,148 | 2/1993 | Suga et al. | 106/20 R |
| 5,190,582 | 3/1993 | Shinozuka et al. | 106/20 D |
| 5,281,261 | 1/1994 | Lin | 106/20 R |
| 5,282,887 | 2/1994 | Gay et al. | 106/261 |
| 5,369,143 | 11/1994 | Kurimoto | 523/215 |
| 5,401,313 | 3/1995 | Supplee et al. | 106/475 |
| 5,461,098 | 10/1995 | Hitchcock | 524/496 |
| 5,554,739 | 9/1996 | Belmont | 534/885 |
| 5,559,169 | 9/1996 | Belmont | 523/215 |
| 5,571,311 | 11/1996 | Belmont et al. | 106/20 R |

(List continued on next page.)

FOREIGN PATENT DOCUMENTS

| | | |
|---|---|---|
| 0 006 190 A1 | 1/1980 | European Pat. Off. . |
| 0 289 231 | 11/1988 | European Pat. Off. . |
| 0 475 075 A1 | 3/1992 | European Pat. Off. . |
| 0 050 354 | 4/1992 | European Pat. Off. . |
| E 72775 | 4/1960 | France . |
| 1331889 | 5/1963 | France . |
| 1948443 | 4/1971 | Germany . |
| 23 55 758 | 5/1975 | Germany . |
| 56078629 | 6/1981 | Japan . |
| 59/82467 | 5/1984 | Japan . |
| 62/250073 | 10/1987 | Japan . |
| 6067421 | 3/1994 | Japan . |
| 862018 | 3/1961 | United Kingdom . |
| 1191872 | 5/1970 | United Kingdom . |
| 2 188 311 | 9/1987 | United Kingdom . |
| WO 91/02034 | 2/1991 | WIPO . |
| WO 91/15425 | 10/1991 | WIPO . |
| WO 92/13983 | 8/1992 | WIPO . |
| WO 92/01838 | 1/1995 | WIPO . |
| WO 96/18688 | 6/1996 | WIPO . |
| WO 96/18694 | 6/1996 | WIPO . |
| WO 96/18695 | 6/1996 | WIPO . |
| WO 96/18696 | 6/1996 | WIPO . |
| WO 96/37547 | 11/1996 | WIPO . |
| WO 97/19134 | 5/1997 | WIPO . |

OTHER PUBLICATIONS

Derwent Abstract, AN No. 80–03330C, "Sulphonated Carbon Pigment Production by Treating Technical Grade Carbon with Hot Aqueous Acid," SU,A, 659523, Apr. 1979.

(List continued on next page.)

*Primary Examiner*—Paul R. Michl

[57] ABSTRACT

Various modified carbon products are disclosed which can form a part of a polymeric product containing the modified carbon product and a polymer. One type of modified carbon product disclosed is a carbon product having attached at least one organic group, monomeric group, or polymeric group. Another type of modified carbon product disclosed is a carbon product having attached a group having the formula: —Ar—CO₂—R or —(—C$_n$H$_{2n}$—)—CO₂—R, where R is an organic group, monomeric group, or a polymeric group. The third type of modified carbon product contains a) a carbon product having attached at least one organic group directly attached to the carbon product, b) at least one ionic group, ionizable group, or a mixture thereof attached to the organic group, and c) at least one counter-ionic group or counter-ionizable group with at least one organic group, monomeric group, or polymeric group, or mixture thereof, where the counter-ionic or counter-ionizable group is attached to the ionic and/or ionizable group. A method of improving the dispersion of carbon products in polymers is also disclosed which involves dispersing the modified carbon products described above in a polymer to form a polymeric product.

36 Claims, No Drawings

U.S. PATENT DOCUMENTS

| | | | |
|---|---|---|---|
| 5,575,845 | 11/1996 | Belmont et al. | 106/712 |
| 5,630,868 | 5/1997 | Belmont et al. | 106/31.75 |
| 5,654,357 | 8/1997 | Menashi et al. | 524/495 |
| 5,672,198 | 9/1997 | Belmont | 106/20 |
| 5,698,016 | 12/1997 | Adams et al. | 106/31.6 |
| 5,707,432 | 1/1998 | Adams et al. | 106/31.6 |
| 5,708,055 | 1/1998 | Joyce | 523/215 |
| 5,713,988 | 2/1998 | Belmont et al. | 106/31.6 |
| 5,747,562 | 5/1998 | Mahmud | 523/215 |
| 5,747,563 | 5/1998 | Flenniken | 523/215 |

OTHER PUBLICATIONS

Derwent Abstract, AN No. 82–28019E, "Penetrating Flexographic Print Ink Based Polyacrylic Resin," Oct. 17, 1979, SU,A, 834062.

Derwent Abstract, AN No. 86–335147, "Wear Resistant Rubber Composition for Tire Tread Rubber," Apr. 30, 1985, JPA 61–250042, Nov. 1986.

Derwent Abstract, AN N. 93–261471, "Carbon Black for Coating Magnetic Recording Media –Having Silicon Dioxide Coating, Giving Good Dispersibility, Lubrication, etc.", Japanese Patent Application No. 5178604, Jul. 20, 1993.

Derwent Abstract, AN No. 95–183086, "Tire Treated Rubber Composition," Apr. 18, 1995, JPA 07102116.

Derwent Abstract, AN No. 94–189154, "Ink for Writing Implements," May 10, 1994, JPA 61–28517A.

Patent Abstracts of Japan Publication No. JP7102116, "Rubber Composition for Tire Tread," Apr. 18, 1995.

Moschopedis, et al., "The Reaction of Diazonium Salts with Humic Acids and Coals: Evidence for Activated Methylene Bridges in Coals and Humic Acids," *Fuel*, vol. 43, No. 4, pp. 289–298, 1964, No Month.

Roberts et al., *Basic Principles of Organic Chemistry*, Second Edition, W.A. Benjamin, Inc., Pub., p. 1080, No Date Available.

Zoheidi et al., "Role of Oxygen Surface Groups in Catalysis of Hydrogasification of Carbon Black by Potassium Carbonate," *Carbon*, vol. 25, No. 6, pp. 809–819, 1987, No Month Available.

Delamar et al., J. Am. Chem. Soc. 1992, 114, 5883–5884, No Month Available.

600

POLYMERIC PRODUCTS CONTAINING MODIFIED CARBON PRODUCTS AND METHODS OF MAKING AND USING THE SAME

This application is a continuation-in-part of U.S. patent application Ser. No. 08/663,694, filed Jun. 14, 1996, now U.S. Pat. No. 5,698,016 incorporated herein by reference in its entirety.

BACKGROUND OF THE INVENTION

The present invention relates to polymers and more particularly relates to the use of fillers, colorants, UV stabilizers, or reinforcement agents in polymers.

Generally, many articles formed from polymers, such as plastics, contain reinforcement agents, fillers, and/or colorants. Generally, such agents, fillers, and colorants like carbon black, are incorporated into the polymers with the use of masterbatches. The masterbatches are used because the direct addition of reinforcement agents, fillers, and colorants like carbon black, may not adequately disperse amongst the polymer which would then result in a less than desirable polymer product. Masterbatches are used as a means to incorporate the reinforcement agent, filler, or colorant, like carbon black, into a polymer. These conventional masterbatches therefore serve as an intermediate step to the ultimate introduction of reinforcement agents, fillers, and colorants into a polymer.

It would be desirable to polymer manufacturers if agents like carbon black could be directly incorporated into the polymer at the same time that the polymers are being formed or at the time when polymers are being formed into a desired article; thus avoiding the need for conventional masterbatches.

SUMMARY OF THE INVENTION

A feature of the present invention is to provide UV stabilizers, reinforcement agents, fillers, and/or colorants like carbon products, such as carbon black, which can be directly incorporated into polymers.

Another feature of the present invention is to provide carbon products which are capable of being dispersed in polymer products to a better degree than conventional carbon products like carbon black.

An additional feature of the present invention is to provide masterbatches which contain higher levels of carbon product, like carbon black, than conventional masterbatches.

Additional features and advantages of the present invention will be set forth in part in the description which follows, and in part will be apparent from the description, or may be learned by practice of the present invention.

To achieve these and other advantages and in accordance with the purpose of the present invention, as embodied and broadly described herein, the present invention relates to a polymer product comprising a polymer and a modified carbon product dispersed therein. The modified carbon product comprises a carbon product having attached at least one organic group, monomeric group and/or polymeric group.

The present invention further relates to a polymeric product comprising a polymer and a modified carbon product dispersed therein, wherein the modified carbon product comprises a carbon product having attached at least one group having the formula: —Ar—$CO_2$—R or —($C_nH_{2n}$—)—$CO_2$—R, where R is an organic group, a monomeric group, or a polymeric group, and n is preferably an integer of from 1 to 12.

In addition, the present invention relates to a modified carbon product comprising a) a carbon product having attached at least one organic group directly attached to the carbon product, b) at least one ionic group, ionizable group, or a mixture thereof attached to said organic group, and c) at least one counter-ionic group with at least one organic group, monomeric group, or polymeric group, or counter-ionizable group with at least one organic group, monomeric group, or polymeric group, or a mixture thereof, wherein the counter-ionic or counter-ionizable group is attached to the ionic and/or ionizable group.

The present invention also relates to polymeric products containing a polymer and one or more of the modified carbon products described immediately above.

The present invention also relates to the modified carbon products used above in the polymeric products.

The present invention further relates to a method of improving the dispersion of carbon products in polymeric products using one or more of the modified carbon products of the present invention.

Also, the present invention relates to masterbatches comprising one or more polymers and one or more modified carbon products of the present invention.

It is to be understood that both the forgoing general description and the following detailed description are exemplary and explanatory only and are intended to provide further explanation of the present invention, as claimed.

DETAILED DESCRIPTION OF THE PRESENT INVENTION

In general, the present invention relates to the use of modified carbon products in polymers. Thus, the present invention relates to a polymeric product containing at least one polymer and at least one modified carbon product dispersed in the polymer and compatible with the polymer.

For purposes of the present invention, one or more polymers can be present in the polymeric product of the present invention. The polymer can be a thermoplastic polymer or a thermosetting polymer. Further, the polymer can be a homopolymer, copolymer, terpolymer, and/or a polymer containing any number of different repeating units. Further, the polymer present in the polymeric product of the present invention can be any type of polymer, such as a random polymer, alternating polymer, graft polymer, block polymer, star-like polymer, and/or comb-like polymer. The polymer used in the polymeric product of the present invention can also be one or more polyblends. The polymer can be an interpenetrating polymer network (IPN); simultaneous interpenetrating polymer network (SIN); or interpenetrating elastomeric network (IEN).

Specific examples of polymers include, but are not limited to, linear-high polymers such as polyethylene, poly (vinylchloride), polyisobutylene, polystyrene, polycaprolactam (nylon), polyisoprene, and the like. Other general classes of polymers which can represent the polymers present in the polymeric product of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers and the like.

Preferably, the polymer present in the polymeric product of the present invention is a polyolefin or polyethylene, more preferably, polymers of alpha olefins dereived from ethylene, 1-butene, propylene, 1-hexene, 1-octene, 4-methyl-1-pentene and substituted alpha-olefins and the like, copolymers of: ethylene, 1-butene, propylene, 1-hexene, 1-octene, 4-methyl-1-pentene and substituted alpha-olefins and the like, and terpolymers comprised primarily of ethylene, 1-butene, propylene, 1-hexene, 1-octene, 4-methyl-1-pentene and substituted alphaolefins and the like.

Generally, the polymers described in Volume 18 of the Encyclopedia of Chemical Technology, KIRK-OTHMER, (1982), page 328 to page 887, and Modern Plastics Encyclopedia '98, pages B-3 to B-210, both incorporated in their entirety herein by reference, can be used as the polymer in the polymeric product of the present invention.

The polymer used in the polymeric product of the present invention can be prepared in a number of ways and such ways are known to those skilled in the art. The above referenced KIRK-OTHMER section and Modem Plastics Encyclopedia provide methods in which these polymers can be prepared.

With respect to the modified carbon product also present in the polymeric product, there are generally three classes of modified carbon products which will be described below.

For purposes of the present invention, a carbon product can be a carbon capable of reacting with a diazonium salt to form the above-mentioned modified carbon products. The carbon may be of the crystalline or amorphous type. Examples include, but are not limited to, graphite, carbon black, vitreous carbon, activated charcoal, carbon fibers and activated carbon. Finely divided forms of the above are preferred; also, it is also possible to utilize mixtures of different carbons.

Also, for purposes of the present invention, carbon product includes an aggregate comprising a carbon phase and a silicon-containing species phase. A description of this aggregate as well as means of making this aggregate are described in PCT Publication No. WO 96/37547 as well as U.S. patent application Ser. Nos. 08/446,141; 08/446,142; 08/528,895; and 08/750,017. All of these patents, publications, and patent applications are hereby incorporated in their entireties herein by reference.

The carbon product, for purposes of the present invention, can also be an aggregate comprising a carbon phase and metal-containing species phase where the metal-containing species phase can be a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal-containing species phase is described in U.S. patent application Ser. No. 08/828,785 filed Mar. 27, 1997, also hereby incorporated in its entirety herein by reference.

Also, for purposes of the present invention, a carbon product includes a silica-coated carbon black, such as that described in PCT Publication No. WO 96/37547, published Nov. 28, 1996, also incorporated in its entirety herein by reference.

The first type of modified carbon product is a modified carbon product containing a carbon product having attached at least one organic group, monomeric group, or polymeric group. The organic group can be an aromatic group or an alkyl group.

The polymeric group can be any polymeric group capable of being attached to a carbon product. The polymeric group can be a polyolefin group, a polystyrenic group, a polyacrylate group, a polyamide group, a polyester group, or mixtures thereof. Monomeric groups are monomeric versions of the polymeric groups.

The organic group can also be an olefin group, a styrenic group, an acrylate group, an amide group, an ester, or mixtures thereof. The organic group can also be an aromatic group or an alkyl group, either group with an olefin group, a styrenic group, an acrylate group, an amide group, an ester group, or mixtures thereof, wherein preferably the aromatic group, or the alkyl group, like a $C_1$–$C_{12}$ group, is directly attached to the carbon product.

The polymeric group can include an aromatic group or an alkyl group, like a $C_1$–$C_{12}$ group, either group with a polyolefin group, a polystyrenic group, a polyacrylate group, a polyamide group, an polyester group, or mixtures thereof.

The organic group can also comprise an aralkyl group or alkylaryl group, which is preferably directly attached to the carbon product. Other examples of organic groups include a $C_1$–$C_{100}$ alkyl group, and more preferably a $C_{20}$–$C_{60}$ alkyl group.

More preferred examples of the organic group are organic groups having the following formulas (hyphens on one or more ends represents an attachment to a carbon product or to another group):

—Ar—$CO_2(C_mH_{2m+1})$, where m=0 to about 20;

—Ar—$(C_nH_{2n+1})$, where n=1 to about 50;

—Ar—$(-C_pH_{2p}-)$—Ar—, where p=1 to about 10;

—Ar—$CX_3$, where X is a halogen atom;

—Ar—O—$CX_3$, where X is a halogen atom;

—Ar—SO—;

—Ar—$SO_2(C_qH_{2q-1})$, where q=about 2 to about 10;

—Ar—$S_2$—Ar—$NH_2$;

—Ar—$S_2$—Ar—;

—Ar$SO_2H$;

or mixtures thereof.

Preferred mixtures of organic groups include the following:

—Ar—$SO_3^-$ and —Ar$(C_nH_{2n+1})$, where n=1 to about 50;

—Ar—$S_2$—Ar—$NH_2$ and —Ar—$(-C_pH_{2p}-)$—Ar—, where p=1 to about 10;

—Ar—$S_2$—Ar— and —Ar—$(-C_pH_{2p}-)$—Ar—, where p=1 to about 10; or at least two different —Ar—$CO_2(C_mH_{2m+1})$, where m=0 to about 20.

The various organic, monomeric, and polymeric groups described above and below which are part of the modified carbon product can be unsubstituted or substituted and can be branched or linear.

One process for attaching an organic group to the carbon product involves the reaction of at least one diazonium salt with a carbon product in the absence of an externally applied current sufficient to reduce the diazonium salt. That is, the reaction between the diazonium salt and the carbon product proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon product in a protic reaction medium. Mixtures of different diazonium salts may be used in this process of the invention. This process can also be carried out under a variety of reaction conditions.

In both processes, the diazonium salt can be formed in situ. If desired, in either process, the carbon product can be isolated and dried by means known in the art. Furthermore, the resultant carbon product can be treated to remove impurities by known techniques. Various specific embodiments of these processes are discussed below.

These processes can be carried out under a wide variety of conditions and in general are not limited by any particular condition. The reaction conditions must be such that the particular diazonium salt is sufficiently stable to allow it to react with the carbon product. Thus, the processes can be carried out under reaction conditions where the diazonium salt is short lived. The reaction between the diazonium salt and the carbon product occurs, for example, over a wide range of pH and temperature. The processes can be carried out at acidic, neutral, and basic pH. Preferably, the pH ranges from about 1 to 9. The reaction temperature may range from 0° C. to 100° C.

Diazonium salts, as known in the art, may be formed for example by the reaction of primary amines with aqueous solutions of nitrous acid. A general discussion of diazonium salts and methods for their preparation is found in Morrison and Boyd, *Organic Chemistry*, 5th Ed., pp. 973–983, (Allyn and Bacon, Inc. 1987) and March, *Advanced Organic Chemistry: Reactions, Mechanisms, and Structures*, 4th Ed., (Wiley, 1992). According to this invention, a diazonium salt is an organic compound having one or more diazonium groups.

The diazonium salt may be prepared prior to reaction with the carbon product or generated in situ using techniques known in the art. In situ generation also allows the use of unstable diazonium salts such as alkyl diazonium salts and avoids unnecessary handling or manipulation of the diazonium salt. Both the nitrous acid and the diazonium salt can be generated in situ.

A diazonium salt, as is known in the art, may be generated by reacting a primary amine, a nitrite and an acid. The nitrite may be any metal nitrite, such as lithium nitrite, sodium nitrite, potassium nitrite, or zinc nitrite, or any organic nitrite such as for example isoamylnitrite or ethylnitrite. The acid may be any acid, inorganic or organic, which is effective in the generation of the diazonium salt. Acids include nitric acid, $HNO_3$, hydrochloric acid, HCl, and sulfuric acid, $H_2SO_4$.

The diazonium salt may also be generated by reacting the primary amine with an aqueous solution of nitrogen dioxide. The aqueous solution of nitrogen dioxide, $NO_2/H_2O$, provides the nitrous acid needed to generate the diazonium salt. Generating the diazonium salt in the presence of excess HCl may be less preferred than other alternatives because HCl is corrosive to stainless steel. Generation of the diazonium salt with $NO_2/H_2O$ has the additional advantage of being less corrosive to stainless steel or other metals commonly used for reaction vessels. Generation using $H_2SO_4/NaNO_2$ or $HNO_3 NaNO_2$ are also relatively non-corrosive.

In general, generating a diazonium salt from a primary amine, a nitrite, and an acid requires two equivalents of acid based on the amount of amine used. In an in situ process, the diazonium salt can be generated using one equivalent of the acid. When the primary amine contains a strong acid group, adding a separate acid may not be necessary. The acid group or groups of the primary amine can supply one or both of the needed equivalents of acid. When the primary amine contains a strong acid group, preferably either no additional acid or up to one equivalent of additional acid is added to a process of the invention to generate the diazonium salt in situ. A slight excess of additional acid may be used. One example of such a primary amine is para-aminobenzenesulfonic acid (sulfanilic acid).

In general, diazonium salts are thermally unstable. They are typically prepared in solution at low temperatures, such as 0–5° C., and used without isolation of the salt. Heating solutions of some diazonium salts may liberate nitrogen and form either the corresponding alcohols in acidic media or the organic free radicals in basic media.

However, the diazonium salt need only be sufficiently stable to allow reaction with the carbon product. Thus, the processes can be carried out with some diazonium salts otherwise considered to be unstable and subject to decomposition. Some decomposition processes may compete with the reaction between the carbon product and the diazonium salt and may reduce the total number of organic groups attached to the carbon product. Further, the reaction may be carried out at elevated temperatures where many diazonium salts may be susceptible to decomposition. Elevated temperatures may also advantageously increase the solubility of the diazonium salt in the reaction medium and improve its handling during the process. However, elevated temperatures may result in some loss of the diazonium salt due to other decomposition processes.

Reagents can be added to form the diazonium salt in situ, to a suspension of carbon product in the reaction medium, for example, water. Thus, a carbon product suspension to be used may already contain one or more reagents to generate the diazonium salt and the process accomplished by adding the remaining reagents.

Reactions to form a diazonium salt are compatible with a large variety of functional groups commonly found on organic compounds. Thus, only the availability of a diazonium salt for reaction with a carbon product limits the processes of the invention.

The processes can be carried out in any reaction medium which allows the reaction between the diazonium salt and the carbon product to proceed. The reaction medium can be a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The processes can be carried out in a protic reaction medium, that is, in a protic solvent alone or a mixture of solvents which contains at least one protic solvent. Preferred protic media include, but are not limited to water, aqueous media containing water and other solvents, alcohols, and any media containing an alcohol, or mixtures of such media.

The reaction between a diazonium salt and a carbon product can take place with any type of carbon product, for example, in fluffy or pelleted form. In one embodiment designed to reduce production costs, the reaction occurs during a process for forming carbon product pellets. For example, a carbon black product of the invention can be prepared in a dry drum by spraying a solution or slurry of a diazonium salt onto a carbon black Alternatively, the carbon product can be prepared by pelletizing a carbon product in the presence of a solvent system, such as water, containing the diazonium salt or the reagents to generate the diazonium salt in situ. Aqueous solvent systems are preferred. Accordingly, another embodiment provides a process for forming a pelletized carbon product comprising the steps of: introducing a carbon product and an aqueous slurry or solution of a diazonium salt into a pelletizer, reacting the diazonium salt with the carbon product to attach an organic group to the carbon product, and pelletizing the resulting carbon product having an attached organic group. The pelletized carbon product product may then be dried using conventional techniques.

In general, the processes produce inorganic by-products, such as salts. In some end uses, such as those discussed below, these by-products may be undesirable. Several possible ways to produce a modified carbon product without unwanted inorganic by-products or salts are as follows:

First, the diazonium salt can be purified before use by removing the unwanted inorganic by-product using means known in the art. Second, the diazonium salt can be generated with the use of an organic nitrite as the diazotization agent yielding the corresponding alcohol rather than an inorganic salt. Third, when the diazonium salt is generated from an amine having an acid group and aqueous $NO_2$, no inorganic salts are formed. Other ways may be known to those of skill in the art.

In addition to the inorganic by-products, a process may also produce organic by-products. They can be removed, for example, by extraction with organic solvents. Other ways of obtaining products without unwanted organic by-products may be known to those of skill in the art and include washing or removal of ions by reverse osmosis.

The reaction between a diazonium salt and a carbon product forms a modified carbon product having an organic group attached to the carbon product. The diazonium salt may contain the organic group to be attached to the carbon product. It may be possible to produce the modified carbon products used in this invention by other means known to those skilled in the art.

The organic group may be an aliphatic group, a cyclic organic group, or an organic compound having an aliphatic portion and a cyclic portion. As discussed above, the diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the carbon product from the reaction between the diazonium salt and the carbon product may be diminished.

When the organic group is substituted, it may contain any functional group compatible with the formation of a diazonium salt. Functional groups include, but are not limited to, R, OR, COR, COOR, OCOR, carboxylate salts such as COOLi, COONa, COOK, COO$^-$NR$_4^+$, halogen, CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na2, N=NR, NR$_3^+$X$^-$, PR$_3^+$X$^-$, S$_k$R, SSO$_3$H, SSO$_3^-$ salts, SO$_2$NRR', SO$_2$SR, SNRR', SNQ, SO$_2$NQ, CO$_2$NQ, S-(1,4-piperazinediyl)-SR, 2-(1,3-dithianyl) 2-(1,3-dithiolanyl), SOR, and SO$_2$R. R and R', which can be the same or different, are independently hydrogen, branched or unbranched C$_1$–C$_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_z$, (CH$_2$)$_x$NR(CH$_2$)$_z$, or (CH$_2$)$_x$S(CH$_2$)$_z$ where w is an integer from 2 to 6 and x and z are integers from 1 to 6.

The organic group can be an aromatic group of the formula A$_y$Ar—, which corresponds to a primary amine of the formula A$_y$ArNH$_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups; and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are NH$_2$—C$_6$H$_4$—, CH$_2$CH$_2$—C$_6$H$_4$—NH$_2$, CH$_2$—C$_6$H$_4$—NH$_2$, and C$_6$H$_5$.

Another set of organic groups which may be attached to the carbon product are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. When the organic group contains an ionizable group forming an anion, such an organic group can have a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. The aromatic group of the organic group can be directly attached to the carbon product. The aromatic group may be further substituted or unsubstituted, for example, with alkyl groups. The organic group can be a phenyl or a naphthyl group and the acidic group is a sulfonic acid group, a sulfinic acid group, a phosphonic acid group, or a carboxylic acid group. Examples of these acidic groups and their salts are discussed above. The organic group can be a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo) naphthyl group or a salt thereof. An example of a substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4hydroxy-3-sulfophenyl (2-hydroxy-5-amino-benzenesulfonic acid), and 2-sulfoethyl (2-aminoethanesulfonic acid). Other organic groups having ionizable functional groups forming anions can also be used.

Amines represent examples of ionizable functional groups that form cationic groups. For example, amines may be protonated to form ammonium groups in acidic media. An organic group having an amine substituent can have a pKb of less than 5. Quaternary ammonium groups ($-NR_3^+$) and quaternary phosphonium groups ($-PR_3^+$) also represent examples of cationic groups. The organic group can contain an aromatic group such as a phenyl or a naphthyl group and a quaternary ammonium or a quaternary phosphonium group. The aromatic group can be directly attached to the carbon product. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the modified carbon products having an attached organic group substituted with an ionic or an ionizable group is that the modified carbon product product may have increased water dispersibility relative to the corresponding untreated carbon product. Water dispersibility of a modified carbon product increases with the number of organic groups attached to the carbon black having an ionizable group or the number of ionizable groups attached to a given organic group. Thus, increasing the number of ionizable groups associated with the modified carbon product should increase its water dispersibility and permits control of the water dispersibility to a desired level. It can be noted that the water dispersibility of a modified carbon product containing an amine as the organic group attached to the carbon product may be increased by acidifying the aqueous medium.

Because the water dispersibility of the modified carbon products depends to some extent on charge stabilization, the ionic strength of the aqueous medium can be less than 0.1 molar. The ionic strength can also be less than 0.01 molar.

When such a water dispersible modified carbon product is prepared, the ionic or ionizable groups can be ionized in the reaction medium. The resulting product solution or slurry may be used as is or diluted prior to use. Alternatively, the modified carbon product may be dried by techniques used for conventional carbon blacks. These techniques include, but are not limited to, drying in ovens and rotary kilns. Overdrying, however, may cause a loss in the degree of water dispersibility.

In addition to their water dispersibility, modified carbon products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products having an organic group containing a metal salt of an acidic group.

Aromatic sulfides encompass another group of organic groups. Modified carbon products having aromatic sulfide groups are particularly useful in rubber compositions. These aromatic sulfides can be represented by the formulas $Ar(CH_2)_qS_k(CH_2)_rAr'$ or $A-(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Arylene groups can include phenylene groups, particularly p-phenylene groups, or benzothiazolylene groups. Aryl groups can include phenyl, naphthyl and benzothiazolyl. The number of sulfurs present, defined by k preferably ranges from 2 to 4. Modified carbon products can have an attached aromatic sulfide organic group of the formula $-(C_6H_4)-S_k-(C_6H_4)-$, where k is an integer from 1 to 8, and more preferably where k ranges from 2 to 4. Aromatic sulfide groups can be bis-para-$C_6H_4)-S_2-(C_6H_4)-$ and para-$(C_6H_4)-S_2-(C_6H_5)$. The diazonium salts of these aromatic sulfide groups may be conveniently prepared from their corresponding primary amines, $H_2N-Ar-S_k-Ar'-NH_2$ or $H_2N-Ar-S_k-Ar''$. Groups includedithiodi-4,1-phenylene, tetrathiodi4,1-phenylene, phenyldithiophenylene, dithiodi-4,1-(3-chlorophenylene), $-(4-C_6H_4)-S-S-(2-C_7H_4NS)$, $-(4-C_6H_4)-S-S-(4-C_6H_4)-OH$, $6-(2-C_7H_3NS)-SH$, $-(4-C_6H_4)-CH_2CH_2-S-S-CH_2CH_2-(4-C_6H_4)-$, $-(4-C_6H_4)-CH_2CH_2-S-S-S-CH_2CH_2-(4-C_6H_4)-$, $-(2-C_6H_4)-S-S-(2-C_6H_4)-$, $-(3-C_6H_4)-S-S-(3-C_6H_4)-$, $6-(C_6H_3N_2S)$, $-6-(2-C_7H_3NS)-S-NRR'$ where RR' is $-CH_2CH_2OCH_2CH_2-$, $-(4-C_6H_4)-S-S-S-(4-C_6H_4)-$, $-(4-C_6H_4)-CH=CH_2$, $-(4C_6H_4)-S-SO_3H$, $-(4-C_6H_4)-SO_2NH-(4-C_6H_4)-S-S-(4-C_6H_4)-NHSO_2-(4-C_6H_4)-$, $6-(2-C_7H_3NS)-S-S-2-(6-C_7H_3NS)-$, $-(4-C_6H_4)-S-CH_2-(4-C_6H_4)-$, $-(4-C_6H_4)-SO_2-S-(4-C_6H_4)-$, $-(4-C_6H_4)-CH_2-S-CH_2-(4-C_6H_4)-$, $-(3-C_6H_4)-CH_2-S-CH_2-(3-C_6H)-$, $-(4-C_6H_4)-CH_2-S-S-CH_2-(4-C_6H_4)-$, $-(3-CH_4)-CH_2-S-S-CH_2-(3-C_6H_4)-$, $-(4-C_6H_4)-S-NRR'$ where RR' is $-CH_2CH_2OCH_2CH_2-$, $-(4-C_6H_4)-SO_2NH-CH_2CH_2-S-S-CH_2CH_2-NHSO_2-(4-C_6H_4)-$, $-(4-C_6H_4)-2-(1,3-dithianyl;)$, and $-(4-C_6H_4)-S-(1,4-piperizinediyl)-S-(4-C_6H_4)-$.

Another set of organic groups which may be attached to the carbon product are organic groups having an aminophenyl, such as $(C_6H_4)-NH_2$, $(C_6H_4)-CH_2-(C_6H_4)-NH_2$, $(C_6H_4)-SO_2-(C_6H_4)-NH_2$. Organic groups also include aromatic sulfides, represented by the formulas Ar—Se—Ar' or Ar—Se—Ar", wherein Ar and Ar' are independently arylene groups, Ar" is an aryl and n is 1 to 8. Methods for attaching such organic groups to carbon product are discussed in U.S. patent applications Ser. Nos. 08/356,660, 08/572,525, and 08/356,459, the disclosures of which are fully incorporated by reference herein.

The second type of modified carbon product which can be part of the polymeric product along with a polymer is a carbon product having attached a group having the formula: $-Ar-CO_2-R$, where R is an organic group, monomeric group, or a polymeric group. The organic groups, monomeric groups, and polymeric groups described above with respect to the first type of modified carbon products can be the same with respect to this embodiment as well. Another formula is $-(-C_nH_{2n}-)-CO_2-R$, where n is preferably an integer of from 1 to 12. Specific examples of R groups are $C_{20}-C_{50}$ alkyl groups.

These modified carbon products can be prepared using a carbon product that is first functionalized with a diazonium salt, like the diazonium salt of 4-aminobenzoic acid. For this initial treatment, an equivalent of acid is used so that the treatment yields attached carboxylic acid groups. The acid groups are then esterified with an R containing group, for instance, long chain aliphatic alcohols, using p-toluenesulfonic acid as the catalyst, as shown below, where R in this formula is at least one organic, monomeric, or polymeric group.

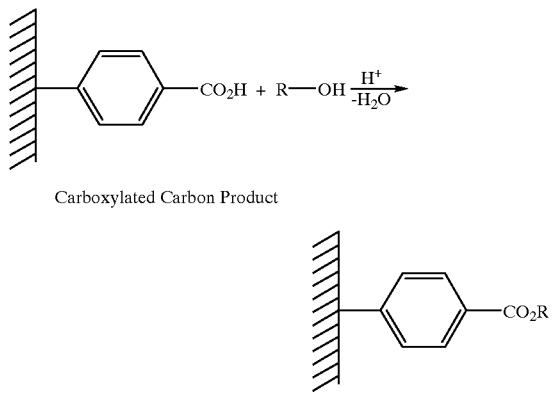

Carboxylated Carbon Product

A third type of modified carbon product is a carbon product having attached a) at least one organic group directly attached to the carbon product, b) at least one ionic group, ionizable group, or mixture thereof attached to the organic group, and c) at least counter-ionic group with at least one organic group, monomeric group, or polymeric group, a counter-ionizable group with at least one organic group, monomeric group, or polymeric group, or a mixture thereof, wherein the counter-ionic group, or counter-ionizable group is attached to the ionic group and/or ionizable group.

The organic group and polymeric group mentioned in the above embodiments can be the same for this embodiment. The monomeric group would simply be monomeric versions of the polymeric groups described above. For instance, examples of monomeric groups include, but are not limited to, an olefin group, a styrenic group, an acrylate group, an amide group, an ester group, or mixtures thereof.

Examples of the ionic group or ionizable group are the same as described above. The ionic group or ionizable group can be an anionic group or a cationic group. Preferred examples of the counter-ionic group or counter-ionizable group include nitrogen-based groups and phosphorous based groups.

Other examples of organic groups include a $C_1$–$C_{50}$ alkyl group, more preferably a $C_1$–$C_{20}$ alkyl group. Other examples of organic groups include an oleyl group, a linoleyl group, a linolenyl group or mixtures thereof. Other examples of organic groups include a 2-ditetradecylglutarate group or a hexa-decyl group.

These modified carbon products can be prepared using a carbon product that is first functionalized with at least one functional group, such as sodium sulfonate groups, for instance using the diazonium salt of sulfanilic acid as described earlier. This process results in the chemical deagglomeration of the carbon product. The degree of deagglomeration can be measured at this stage by particle size analysis and 325 mesh residue.

Next, an aqueous dispersion of the attached functional group, like sulfonated carbon product, is treated with a salt like an alkyl ammonium salt. For instance, the alkylammonium salt can be a primary, secondary, tertiary, or quaternary ammonium salt. Treatment of the dispersed carbon product with the salt, e.g., ammonium salt, results in exchange of the sodium ion for the ammonium ion. When the alkyl group of the ammonium salt is large, flocculation of the carbon product occurs. The carbon product treated in this way is quite hydrophobic and floats to the surface of the water. This approach is attractive because the initial dispersion of carbon product allows each particle of carbon product to be well treated with hydrophobic groups. This preferred reaction is shown below, where R in this formula is at least one organic, monomeric, or polymeric group. The process described in U.S. patent application Ser. No. 08/663,694 filed Jun. 14, 1996 can also be used and is hereby incorporated in its entirety by reference herein.

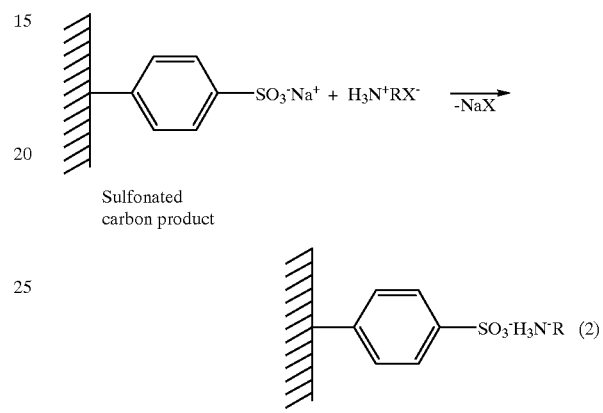

Sulfonated carbon product

The amount of modified carbon product present in the polymeric product (where the polymeric product is not a masterbatch) can be amounts traditionally used with unmodified carbon products such as carbon black. For example, from about 0.01 wt % to about 50 wt %, more preferably from about 0.01 wt % to about 20 wt %, and most preferably, from about 0.01 wt % to about 5.0 wt % of the modified carbon product can be present based on the weight of the polymeric product.

The modified carbon products of the present invention can be used as masterbatches. In this embodiment, the modified carbon product is formed into a masterbatch just as conventional masterbatches are formed. Accordingly, the modified carbon product can be added with standard masterbatch ingredients which may include waxes and polymers as well as other optional ingredients. When the modified carbon products of the present invention are used to form masterbatches, generally, the amount of modified carbon product present can be amounts traditionally used with unmodified carbon products, such as carbon black, in masterbatches. However, with the modified carbon products of the present invention, masterbatches with higher loadings of carbon products are possible and thus masterbatches of the present invention can contain from about 10 wt % to about 95 wt % or more modified carbon product, and more preferably from about 50 wt % to about 90 wt % modified carbon product, based on the weight of the masterbatch.

The modified carbon products of the present invention can be incorporated or dispersed in the polymer to form the polymeric product using any means which permits the introduction of the reinforcement agents, fillers, or colorants like carbon black. Examples include hopper feeding of the modified carbon product into an extruder such as a single screw or multi-screw extruder, or an injection molder. Other means of introducing the modified carbon product into the polymer include mixers, like internal mixers, such as a Banbury and Brabender mixers. Other means of introducing, and preferably dispersing the modified carbon product in the polymer include, but are not limited to, long continuous mixers, continuous compounding extruders (e.g., Buss Kneader), tumble blenders, pelletizers and the like.

The polymeric products of the present invention, like any conventional polymer, can be formed and shaped into any desired article or shape.

Further, the polymeric products of the present invention include polymeric coatings and polymeric foams. With respect to polymeric coatings, typically an aqueous or non-aqueous solvent will be present in amounts typically found with respect to conventional polymeric coatings. With respect to polymeric foams, typically a foaming agent will be present in amounts conventionally found with respect to conventional polymeric foams.

The polymeric products of the present invention can include additional conventional ingredients typically found in polymers such as anti-oxidants, stabilizers (e.g., light/UV and thermal types), plasticizers, fillers, impact modifiers, lubricants, biocides, flame retardants, process modifiers, antistatic agents, blowing (foaming) agents, colorants, antimicrobials, antiblocking agents, organic peroxides, optical brighteners, coupling agents, compatibilizers, process acids, mold release aids, tack additives, viscosity suppressants, reactive additives, fibers, antifogging agents, antihazing agents, bacteriocides, conductivity agents, cross-linking agents, delustering agents, dispersants, flexibilizers, flow control agents, fluorescent agents, fusion promoters, mildewcides and fungicides, nucleating agents, organic chelating agents, surface treatments, and the like, or other materials as described in Plastic Additives and Modifiers Handbook, Jesse Edenbaum, Ed., pp. 193–1086 (1992), incorporated herein by reference.

The present invention will be further clarified by the following examples, which are intended to be purely exemplary of the present invention.

In all of the examples, except when stated, a carbon black having a surface area of 90 $m^2/g$ (CTAB) and a DBPA of 98 cc/100 g was used, in this case ELFTEX® TP from Cabot Corp.

EXAMPLE 1

Carbon black (225 g) was slurried in 2 L of room temperature deionized water using an overhead mixer. Ethyl-4-aminobenzoate (4.5 g) was dissolved in 2.7 grams of 37% hydrochloric acid. Deionized water (100 mL) was added to dissolve the resulting salt. This solution was then added to the stirred carbon black slurry. Sodium nitrite (1.7 g) was dissolved in 50 mL of deionized water and then added to the stirred carbon black slurry. After several hours of mixing, the mixing was stopped. Upon standing, the mixture separated into three layers consisting of a top and bottom layer of carbon black separated by a colorless water layer. The mixture was filtered and the modified carbon black product was collected on a Büchner funnel using vacuum filtration. After washing the product with 2 L of deionized water, it was dried at 70° C. to a constant weight.

EXAMPLE 2

Fluffy carbon black (5 kg) was treated at 70° C. with sulfanilic acid (310 g) in a batch pin pelletizer. The pelletizer was charged with the carbon black and sulfanilic acid and the motor speed was set to about 200 rpm. The pelletizer was heated to 70° C. Sodium nitrite (125 g) was dissolved in 1 L of water. The nitrite solution was added via a pressurized delivery system to the pelletizer. Likewise, 3 L of water were added. After all the water had been added, the batch was mixed for 3 minutes. Wet pellets of the sulfonated carbon black were then collected. The pellets were found to contain 42% water by weight. The wet pellets were used without drying for the ion exchange reactions below in Examples 2A–2D.

EXAMPLE 2A

Wet sulfonated carbon black (387 g) was added with stirring to 2 L of room temperature deionized water. Cetyltrimethylammonium bromide (29.5 g) was dissolved in 500 mL of deionized water. The resulting solution was added to the stirred carbon black slurry. After several hours of mixing the stirring was stopped. The mixture slowly separated into three layers. The top layer consisted of black foam, the middle layer was clear while the bottom layer consisted of settled carbon ) black. The modified carbon product was collected on a Büchner funnel, washed with 2 L of deionized water and dried to a constant weight at 70° C.

EXAMPLE 2B

Armeen SD (21.4 g from Akzo-Nobel) was added to 1.7 L of 10% acetic acid at room temperature. Once the amine was completely dissolved, 387 g of wet sulfonated carbon black was stirred in with an overhead mixer. Mixing was continued for 16 hours. As observed for the reaction with cetyltrimethylammonium bromide, the mixture separated into three layers. The modified carbon black product was collected on a Büchner funnel and washed with 2 L of a 50/50 mixture of ethanol and water followed by 2 L of water. The modified carbon black was dried to a constant weight at 70° C. This procedure was also followed using oleylamine and hexadecylamine.

EXAMPLE 2C

To soyaalkyl amine (28.6 g, Adogen 172 D from Witco) was added to 6.49 g of acetic acid diluted with 150 mL of deionized water and 50 mL of ethanol. Once the amine was dissolved, it was added with stirring to 172 g of wet sulfonated carbon black dispersed in 2 L of room temperature deionized water. After about 4 hours, the stirring was stopped and the mixture separated into three layers. The entire mixture was filtered using a Büchner funnel to isolate the modified carbon black product. It was then washed with 3 L of deionized water. The modified carbon black was dried overnight at 70° C. to a constant weight.

EXAMPLE 2D

A 1 L beaker was filled with 800 mL of deionized water and 50 g of carbon black. While stirring vigorously, the temperature was raised to 70° C. Sulfanilic acid (1.56 g) was added to the slurry. Next, a solution of sodium nitrite (0.62 g) in 3 mL of water was added to the stirred slurry. The mixture was stirred overnight at 70° C. The resulting treated carbon black suspension was placed in a vacuum oven and dried at 70° C. for several days to evaporate most of the water. The product contained about 40% water by weight.

The sulfonated carbon black thus prepared (50 g of wet carbon black) was mixed into 650 mL of room temperature deionized water in a 1 L beaker. Mixing was accomplished using a magnetic stirrer and a stir bar. Benzoic acid (0.66 g) and Amine D (1.51 g, from Hercules) were dissolved into ~150ml of toluene. Once both species were dissolved, the mixture was added directly to the dispersion of sulfonated carbon black. The resulting mixture was allowed to stir vigorously overnight. The modified carbon black product was isolated by evaporation of the water and toluene in a vacuum oven at 70° C. This method can also be employed using Foral 85 (also from Hercules) instead of Amine D.

EXAMPLE 3

Carbon black (200 g) was slurried in 2 L of room temperature deionized water using an overhead mixer. 4-aminobenzoic acid (4.94 g) was dissolved in 3.24 g of 70% nitric acid diluted with 150 mL of deionized water. After 20 minutes of stirring, the 4-aminobenzoic acid was dissolved and the solution was added to the carbon black slurry. Sodium nitrite (2.42 g) was dissolved in 50 mL of deionized water. The resulting solution was added slowly to the carbon black slurry. Gas was evolved and the slurry became much less viscous. After 4 hours of mixing, the overhead stirred was stopped. The modified carbon black product was isolated on a Büchner funnel, washed with 2 L of deionized water and dried to a constant weight at 70° C.

Next, the modified carbon black with attached carboxylic acid groups (50 g) was placed in a 1 L three necked round bottom flask. Toluene (200 mL) was added to the flask and the flask was fitted with a Dean-Stark trap. The trap was charged with toluene. To dry the modified carbon black of any residual water, the toluene-modified carbon black slurry was heated to reflux using a heating mantle. After 4 hours, 0.3 mL of water had collected in the trap. The slurry was cooled to room temperature under nitrogen. Uniline 425 from Petrolite Corp. (4.14 g), a long chain alkyl alcohol (C. avg.), a p-toluenesulfonic acid (1.71 g) were added to the flask. A few drops of water had collected in the trap after heating the slurry at reflux for 3 hours. The slurry was cooled to room temperature under nitrogen.

The modified carbon black was collected on a Büchner funnel. An additional 300 mL of toluene was used to complete the transfer of the modified carbon black from the flask to the Büchner funnel. The modified carbon black was washed on the filter with 800 mL of a 50/50 ethanol and water mixture followed by 2 L of water. The modified carbon black was allowed to air dry for 4 hours before drying to a constant weight at 70° C.

EXAMPLE 4

Control samples were prepared from carbon black pelletized in a laboratory scale batch pelletizer and from carbon black dried from slurry. The second treatment simulated the chemical treatment process, but used no reactive species. The carbon blacks were compounded at 2.5 wt % carbon black loading in high density polyethylene using a 1.6 liter Banbury internal mixer and four minute mixing cycle. Both data sets show the poor dispersion quality achieved with no chemical treatment. The results of compounding pelleted black in HDPE are shown in Table 1, and the results of compounding carbon black dried from slurry in HDPE are shown in Table 2. The overall average dispersion ratings were 1.78% undispersed area for pelleted black and 1.71% undispersed area for slurry dried carbon black.

TABLE 1

Direct Addition Controls Process Pelletizer

| Sample No. | Mean Undispersed Area % |
|---|---|
| 1 | 1.42 |
| 2 | 1.56 |
| 3 | 1.90 |
| 4 | 1.94 |
| 5 | 2.04 |
| 6 | 2.26 |
| 7 | 1.54 |
| 8 | 1.60 |

Overall Average == 1.78

TABLE 2

Direct Addition Controls, Carbon Black Dried from

| Sample No. | Mean Undispersed Area % |
|---|---|
| 1 | 1.34 |
| 2 | 1.36 |
| 3 | 1.44 |
| 4 | 1.92 |
| 5 | 1.95 |
| 6 | 2.26 |

Overall Average == 1.71

Sample 2 in Table 1 was a commercially available pelletized ELFTEX® carbon black product.

EXAMPLE 5

The modified carbon blacks from Examples 1–3 were compounded at 2.5 wt % carbon black loading in high density polyethylene (HDPE) using a 1.6 liter Banbury internal mixer and a four minute mixing cycle. The modified carbon black filled compounds were compared to compounds with unmodified carbon black compounded by the same method and to compounds prepared by first masterbatching the carbon black in HDPE at 40% loading, and then diluting the carbon black to 2.5% in a second processing step. The latter compounds represent the current state of the art for coloring plastics.

A Kontron plastics dispersion test was used to distinguish whether a chemical treatment improves the dispersion of carbon black in plastics. The Kontron plastics dispersion test measures the size and frequency of undispersed carbon agglomerates present in a calibrated, about 100 X, digital micrograph of a thin polymeric film containing a low level (e.g., 2.5% by weight) of carbon black. The thin film was obtained by sandwiching small pieces of the carbon black pigmented polymer compound between glass slides and melting them, under heat and pressure. An automated image analysis program was used to identify and measure all carbon black agglomerates larger than 5 micron diameter. Undispersed area percent, the percent of the image that is covered by agglomerates, is the measured response used for ranking. An undispersed area percent of zero would be a perfect dispersion. The average undispersed area percent for ten images is reported.

The Kontron plastics dispersion test is based on ASTM D 2663, Method B, "Standard Test Methods for Carbon Black—Dispersion in Rubber." Several modifications were made to the ASTM test to allow measuring the dispersion of carbon black in plastics. The plastics films are about 10 times the thickness of rubber microtome sections, while the typical carbon black content in plastics is about 1/10th that of the typical carbon black content in rubber. As a result, the carbon black content as seen in a light micrograph is comparable for the two tests. In the ASTM test, carbon black agglomerates are identified and measured manually by inserting a calibrated grid into the microscope optical path. An operator counts all grid squares that are at least half covered by an agglomerate. The sum of filled squares is converted to Dispersion, % by dividing the sum by the volume percent of carbon black in the compound. This process is automated in the Kontron plastics dispersion test.

Dispersion quality was improved using modified carbon products as shown in Tables 3–5. The modified carbon products were tested in the same manner as described above. Samples 1, 2, 4-9, 11 and 12 of Table 3 were prepared as in Example 1 using the treatment and treatment level (mmol per gram of carbon black) described in Table 3. Samples 3 and 10 were prepared as follows:

Sodium nitrite (2.8 g) was added to 50 mL of concentrated sulfuric acid with stirring. Upon addition of the sodium nitrite, the solution turned orange. The temperature was raised to 70° C., then the solution was cooled.

4-Trifluoromethoxyaniline (7.2 g) or trifluoro methyl aniline at the treatment level indicated in Table 3 was slowly added (over 15 minutes) at 30–35° C. The solution was stirred for two hours.

Carbon black (225 g) was slurried in 2 L of room temperature deionized water using an overhead mixer. The diazonium salt solution prepared above was then added to the slurry. Stirring was continued for several hours. When stirring was stopped, the solution separated into three layers. The top, middle, and bottom layers consisted of a small foamy layer of carbon black, a clear water layer and another carbon black layer. The bulk of the carbon black was contained in the bottom layer. The modified carbon black product was isolated by filtering the entire mixture through a Büchner funnel. The modified carbon black product was washed on the filter with 2 L of water. After washing, the modified carbon black was dried to a constant weight overnight at 70° C.

TABLE 3

| Sample No. | Treatment | Treatment Level (mmol/g) | Mean Undispersed Area % |
| --- | --- | --- | --- |
| 1 | Ethyl-4-aminobenzoate | 0.03 | 0.80 |
| 2 | Ethyl-4-aminobenzoate | 0.12 | 0.41 |
| 3 | Trifluoro methyl aniline | 0.36 | 0.62 |
| 4 | dodecylaniline | 0.12 | 0.96 |
| 5 | dodecylaniline | 0.18 | 0.74 |
| 6 | dodecylaniline | 0.18 | 0.80 |
| 7 | dodecylaniline | 0.36 | 0.89 |
| 8 | 4-tertbutyl aniline | 0.18 | 0.75 |
| 9 | 4-tertbutyl aniline | 0.36 | 0.77 |
| 10 | Trifluoro methoxy aniline | 0.18 | 0.79 |
| 11 | 4-ethyl aniline | 0.12 | 0.88 |
| 12 | 4-ethyl aniline | 0.36 | 0.96 |

The samples in Table 4 were prepared using the same procedure as recited in Example 2 for the primary treatment, and using the particular secondary treatment and secondary treatment level set forth in Table 4. The secondary treatment set forth in Table 4 was based on one of the procedures recited in Examples 2A, B, C, or D as indicated in Table 4.

The samples in Table 5 were prepared in the same manner as in Example 3 above.

TABLE 4

| Sample No. | Primary Treatment | Secondary Treatment | Secondary Procedure (Example) | Treatment | Mean Undispersed Area % |
| --- | --- | --- | --- | --- | --- |
| 1 | Sulfonilic acid, sodium salt | Soya alkylamine | 2B | 0.36 & 0.36 | 0.21 |
| 2 | Sulfonilic acid, sodium salt | Soya alkylamine | 2B | 0.36 & 0.36 | 0.74 |
| 3 | Sulfonilic acid, sodium salt | Soya alkylamine | 2B | 0.36 & 0.36 | 0.76 |
| 4 | Sulfonilic acid, sodium salt | Oleylamine | 2B | 0.36 & 0.36 | 0.25 |
| 5 | Sulfonilic acid, sodium salt | Oleylamine | 2B | 0.36 & 0.36 | 0.82 |
| 6 | Sulfonilic acid, sodium salt | Adogen 172D | 2C | 0.18 & 0.18 | 0.38 |
| 7 | Sulfonilic acid, sodium salt | Foral 85 | 2D | 0.18 & 0.18 | 0.42 |
| 8 | Sulfonilic acid, sodium salt | CTAB | 2A | 0.18 & 0.18 | 0.46 |
| 9 | Sulfonilic acid, sodium salt | Amine D | 2D | 0.36 & 0.36 | 0.69 |
| 10 | Sulfonilic acid, sodium salt | Hexadecyl amine | 2B | 0.18 & 0.18 | 0.70 |
| 11 | Sulfonilic acid, sodium salt | Di-tetradecyl glutamate p-toluene sulfonic acid | 2B | 0.36 & 0.36 | 0.69 |
| 12 | Sulfonilic acid, sodium salt | Di-tetradecyl glutamate p-toluene sulfonic acid | 2D | 0.36 & 0.36 | 0.90 |
| 13 | Sulfonilic acid, sodium salt | Amine D | 2B | 0.18 & 0.18 | 0.69 |
| 14 | Sulfonilic acid, sodium salt | hexadecly amine | | 0.36 & 0.36 | 0.70 |

TABLE 5

| Sample No. | Primary Treatment | Secondary Treatment | Treatment Level (mmol/g) | Mean Undispersed Area % |
| --- | --- | --- | --- | --- |
| 1 | 4-aminobenzoic acid | Uniline 425 | 0.18 & 0.18 mmol/g | 0.75 |
| 2 | 4-aminobenzoic acid | Uniline 700 | 0.18 & 0.18 mmol/g | 0.85 |

Foral 85 and Amine D are terpene derivatives available from Hercules, Incorporated. Adogen 172D is a soya alkylamine available from Witco. Uniline 425 and 700 are long chain primary alcohols available from Petrolite, with average carbon lengths of C30 and C50, respectively. As can be seen in the above Tables, the mean undispersed area was reduced using the modified carbon products of the present invention.

Examples of reactive groups which can be used in a process to make one or more types of the modified carbon product are set forth below in the Tables.

| Name | Structure |
|---|---|
| ethyl-4-aminobenzoate | H₂N–C₆H₄–C(=O)–O–CH₂CH₃ |
| 4-dodecylaniline | H₂N–C₆H₄–(CH₂)₁₁CH₃ |
| 4-tert-butylaniline | H₂N–C₆H₄–C(CH₃)₃ |
| 4-ethylaniline | H₂N–C₆H₄–CH₂CH₃ |
| aniline | H₂N–C₆H₅ |
| 4,4'-ethylenedianiline | H₂N–C₆H₄–CH₂CH₂–C₆H₄–NH₂ |
| 4-trifluoromethylaniline | H₂N–C₆H₄–CF₃ |
| 4-trifluoromethoxyaniline | H₂N–C₆H₄–O–CF₃ |
| sulfanilic acid | H₃N⁺–C₆H₄–SO₃⁻ |
| 4-aminobenzoic acid | H₂N–C₆H₄–C(=O)–OH |

-continued

| Name | Structure |
|---|---|
| (4-aminophenyl)vinylsulfone | H₂N–C₆H₄–SO₂–CH=CH₂ |
| 4-aminophenyldisulfide | H₂N–C₆H₄–S–S–C₆H₄–NH₂ |
| sulfanilic acid and 4-dodecylaniline | |
| 4-aminophenyldisulfide and 4,4'-ethylenedianiline | |
| ethyl-4-aminobenzoate and 4-aminobenzoic acid | |
| hexadecylamine | CH₃(CH₂)₁₅NH₂ |
| hexadecyltrimethylammonium bromide | CH₃(CH₂)₁₅N⁺(CH₃)₃ Br⁻ |
| oleyl amine | oleyl–NH₂ |
| dimethyloleylamine | oleyl–N(CH₃)₂ |
| soyaalkyl amines (Armeen® SD, Adogen® 715D) | mixture of oleyl amine, linoleylamine, linolenylamine |
| trimethyl soyaalkyl ammonium chlorides (Arquad S-50) AK$_{zo}$ Nobel | mixture of quaternary ammonium salts of oleyl amine, linoleylamine, and linolenylamine |
| hydrogenated tallowamine | mixture of C18, C16, C14 n-alkyl primary amines |
| ditetradecylglutamate | H₂₉C₁₄–O–C(O)–CH₂–CH₂–CH(NH₂)–C(O)–O–C₁₄H₂₉ |
| | Average carbon lengths |
| Uniline 350 (alkyl alcohol) | C26 |
| Uniline 425 (alkyl alcohol) | C30 |
| Uniline 550 (alkyl alcohol) | C40 |
| Uniline 700 (alkyl alcohol) | C50 |

The modified carbon products of the present invention may provide for more economical preparation of polymer products (such as by reducing the number of processing steps or amount of processing needed), and/or may improve the characteristics of the polymer products. The improved dispersibility of the modified carbon products of the present invention may allow for improved dispersion in the polymer product, or make it possible to obtain a level of dispersion comparable to that achieved by existing compositions and processes using fewer steps or a reduced amount of processing. In terms of the characteristics of the polymer products, the modified carbon products of the present invention can improve characteristics such as hardness, rebound, impact resistance, colorfastness, abrasion resistance, and the like.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymeric product comprising a polymer and a modified carbon product dispersed therein, said modified carbon product comprising a) a carbon having attached at least one organic group directly attached to the carbon, b) at least one ionic group, ionizable group, or mixture thereof attached to said organic group, and c) at least one counterionic group with at least one organic group, or counter-ionizable group with at least one organic group, or a mixture thereof, wherein said at least one counter-ionic group or counter-ionizable group is attached to said ionic group or ionizable group or both.

2. A method for improving the dispersion of a carbon product in a polymeric product comprising dispersing a masterbatch comprising from about 50 wt % to about 95 wt % of a modified carbon product in a polymer, wherein said modified carbon product comprises a carbon product having attached at least one polymeric group which is compatible with said polymer, wherein said polymeric group is a polyolefin group, a polystyrenic group, a polyacrylate group, a polyamide group, a polyester group, or mixtures thereof.

3. A method for increasing the dispersion of a carbon product in a polymer product comprising dispersing a masterbatch comprising from about 50 wt % to about 95 wt % of a modified carbon product in a polymer, wherein said modified carbon product comprises a carbon product having attached a group having the formula: —Ar—$CO_2$—R, or —(—$C_nH_{2n}$—)—$CO_2$—R, where R is a polymeric group, wherein said polymeric group is a polyolefin group, a polystyrenic group, a polyacrylate group, a polyamide group, a polyester group, or mixtures thereof.

4. A method for increasing the dispersion of a carbon product in a polymeric product comprising dispersing a modified carbon product in said polymer, wherein said modified carbon product is compatible with said polymer and said modified carbon product comprises a) a carbon having attached at least one organic group directly attached to the carbon, b) at least one ionic group, ionizable group, or mixture thereof attached to said organic group, and c) at least one counter-ionic group with at least one organic group, or counter-ionizable group with at least one organic group, or a mixture thereof, wherein said at least one counter-ionic group or counter-ionizable group is attached to said ionic group or ionizable group or both.

5. A polymeric product comprising a polymer and a modified carbon product dispersed therein, wherein said modified carbon product comprises a carbon product having attached at least one polymeric group, wherein said polymeric group is a polyolefin group, a polystyrenic group, a polyacrylate group, a polyamide group, a polyester group, or mixtures thereof, wherein said polymeric product is a masterbatch containing from about 50 wt % to about 90 wt % modified carbon product, based on the weight of the masterbatch.

6. A polymeric product comprising a polymer and a modified carbon product dispersed therein, wherein said modified carbon product comprises a carbon product having attached a group having the formula: —Ar—$CO_2$—R, or —(—$C_nH_{2n}$—)—$CO_2$—R, where R is a polymeric group, wherein said polymeric group is a polyolefin group, a polystyrenic group, a polyacrylate group, a polyamide group, a polyester group, or mixtures thereof, wherein said polymeric product is a masterbatch containing from about 50 wt % to about 90 wt % modified carbon product, based on the weight of the masterbatch.

7. The polymeric product of claim 5, wherein said carbon product is carbon black, graphite, vitreous carbon, finely divided carbon, carbon fiber, activated charcoal, activated carbon, or mixtures thereof.

8. The polymeric product of claim 5, wherein said carbon product is carbon black.

9. The polymeric product of claim 5, wherein said polymeric product is in the form of a masterbatch.

10. The polymeric product of claim 6, wherein said carbon product is carbon black, graphite, vitreous carbon, finely divided carbon, carbon fiber, activated charcoal, activated carbon, or mixtures thereof.

11. The polymeric product of claim 6, wherein said carbon product is carbon black.

12. The polymeric product of claim 1, wherein said organic group is a olefin group, a styrenic group, an acrylate group, an amide group, an ester group, or mixtures thereof.

13. The polymeric product of claim 2, wherein said polymeric group is a polyolefin group, a polystyrenic group, a polyamide group, a polyester group, or mixtures thereof.

14. The polymeric product of claim 1, wherein said organic group attached to carbon product comprises a $C_1$–$C_{12}$ alkyl group directly attached to the carbon product.

15. The polymeric product of claim 1, wherein said organic group attached to said carbon product comprises an aromatic group attached directly to the carbon product.

16. The polymeric product of claim 1, wherein said organic group attached to said carbon comprises an aralkyl group or an alkylaryl group directly attached to the carbon.

17. The polymeric product of claim 1, wherein said ionic group or ionizable group is a carboxylic acid or salt thereof, a sulfonic acid or salt thereof, a quaternary ammonium salt, a sulfonamide or salt thereof, $SO_2NHCOR$ or a salt thereof, where R is a $C_1$–$C_{20}$ alkyl or an aryl group.

18. The polymeric product of claim 1, wherein said counter-ionic group or counter-ionizable group is a nitrogen based group or a phosphorous based group.

19. The polymeric product of claim 1, wherein said ionic or ionizable group is a sulfonate group and said counter-ionic or counter-ionizable group is a nitrogen or phosphorous based group.

20. The polymeric product of claim 1, wherein said organic group is a $C_1$–$C_{50}$ alkyl group.

21. The polymeric product of claim 1, wherein said organic group is a $C_1$–$C_{20}$ alkyl group.

22. The polymeric product of claim 1, wherein said organic group is a oleyl group.

23. The polymeric product of claim 1, wherein said organic group is a oleyl group, a linoleyl group, a linolenyl group, or mixtures thereof.

24. The polymeric product of claim 1, wherein said organic group is a 2-ditetradecylglutarate or hexa-decyl.

25. The polymeric product of claim 1, wherein said carbon product is carbon black, graphite, vitreous carbon, finely divided carbon, carbon fiber, activated charcoal, activated carbon, or mixtures thereof.

26. The polymeric product of claim 1, wherein said carbon product is carbon black.

27. The of claim 1, wherein said polymeric product is a masterbatch.

28. The polymeric product of claim 26, wherein said polymeric product is a masterbatch.

29. The polymeric product of claim 1, wherein said ionic or ionizable group is a anionic group and said counter-ionic or counter-ionizable group is a cationic group.

30. The polymeric product of claim 1, wherein said ionic group or ionizable group is a cationic group and said counter-ionic or counter-ionizable group is a anionic group.

31. The polymeric product of claim 1, wherein said counter-ionic group or counter-ionizable group is a carboxylic acid or salt thereof, a sulfonic acid or salt thereof, a quaternary ammonium salt, a sulfonamide or salt thereof, $SO_2NHCOR$ or a salt thereof, where R is a $C_1$–$C_{20}$ alkyl or an aryl group.

32. The polymeric product of claim 1, wherein said ionic or ionizable group is a nitrogen based group or a phosphorous based group.

33. The polymeric product of claim 1, wherein said polymeric product is a masterbatch containing from about 10 wt % to about 95 wt % modified carbon product, based on the weight of the masterbatch.

34. The polymeric product of claim 1, wherein said polymeric product is a masterbatch containing from about 50 wt % to about 90 wt % modified carbon product, based on the weight of the masterbatch.

35. The polymeric product of claim 1, wherein said organic group is a monomeric group.

36. The polymeric product of claim 1, wherein said organic group is a polymeric group.

* * * * *